July 20, 1971 E. W. DRUM 3,594,211
AUTOMATIC COATING SYSTEM
Filed Oct. 20, 1966 4 Sheets-Sheet 1

INVENTOR
Edward W. Drum
BY Hofgren, Wegner, Allen, Stellman & McCord
ATTORNEYS

July 20, 1971 E. W. DRUM 3,594,211
AUTOMATIC COATING SYSTEM
Filed Oct. 20, 1966 4 Sheets-Sheet 2

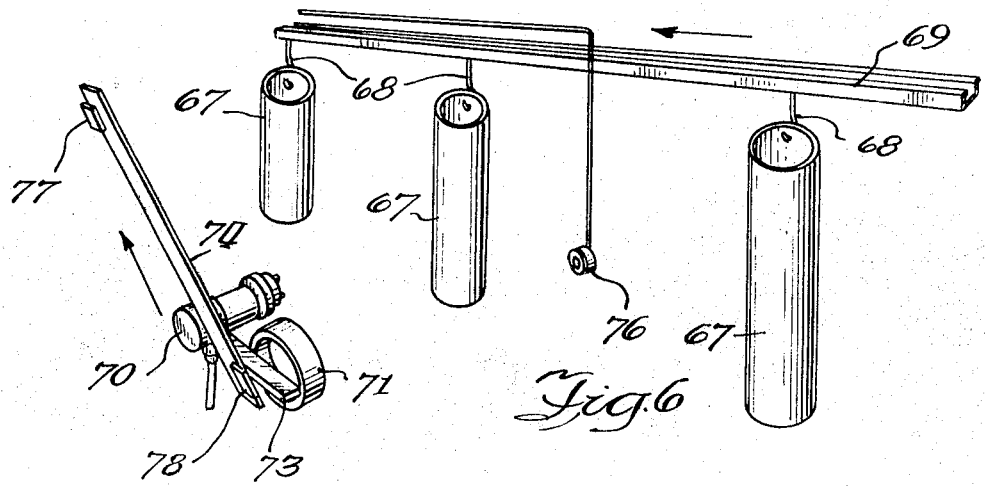
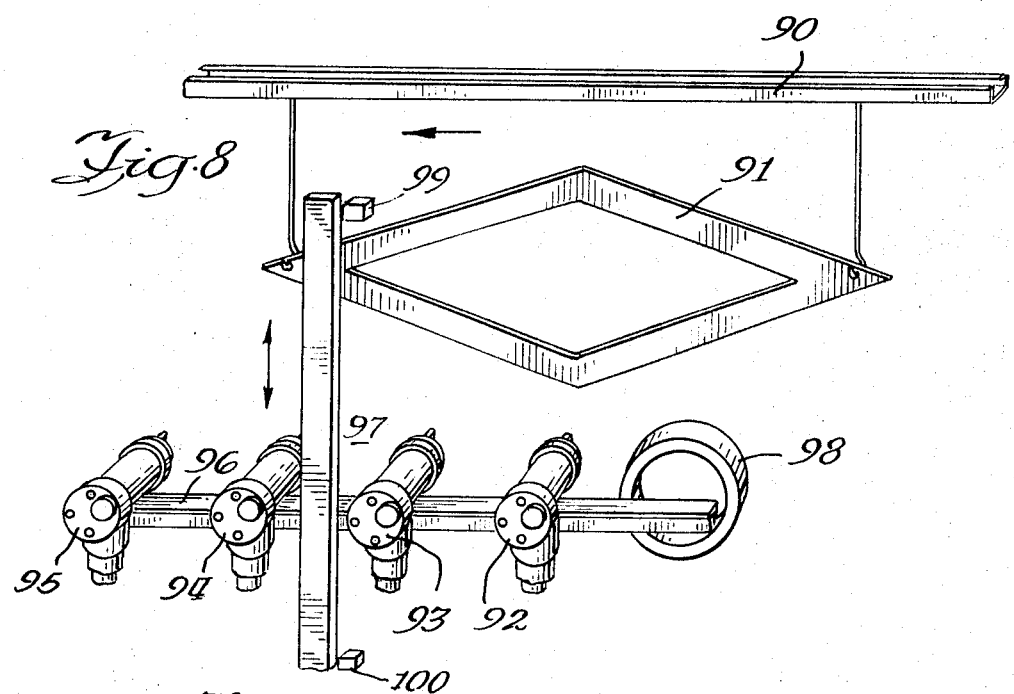
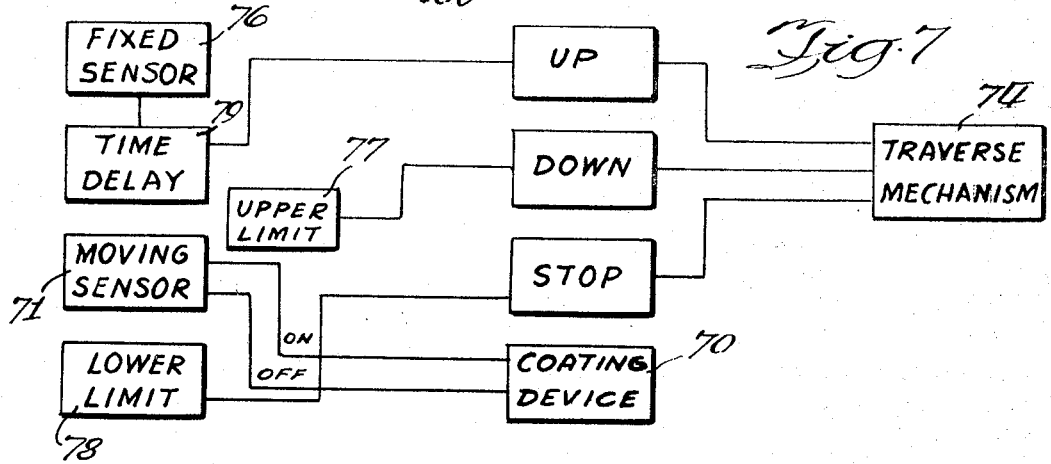

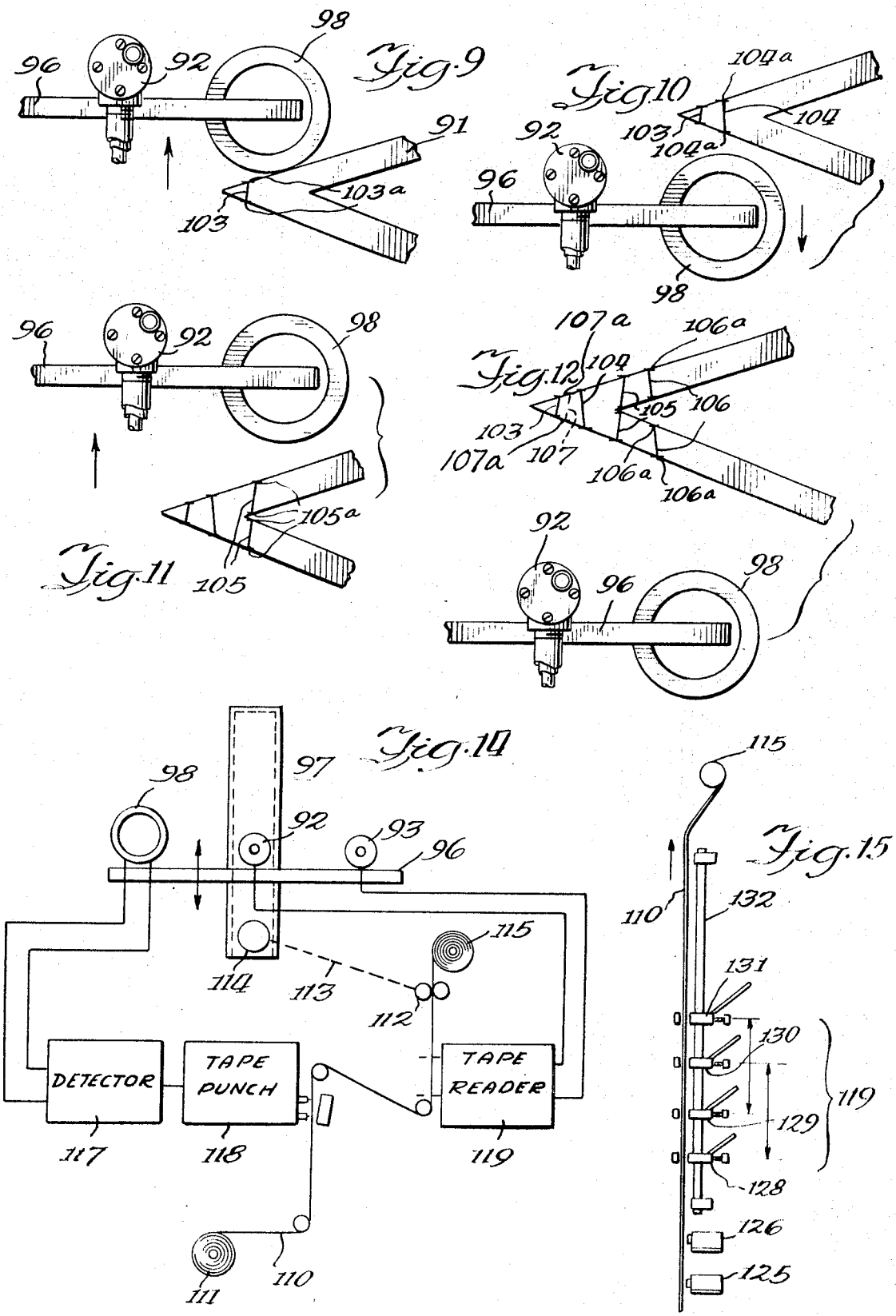

3,594,211
AUTOMATIC COATING SYSTEM
Edward W. Drum, Indianapolis, Ind., assignor to
Ransburg Electro-Coating Corporation
Filed Oct. 20, 1966, Ser. No. 588,181
Int. Cl. B05c 1/16, 3/20
U.S. Cl. 117—43                                    4 Claims

ABSTRACT OF THE DISCLOSURE

Methods of coating irregularly shaped articles and of shading the edges of articles are performed automatically using a sensor that moves with the coating apparatus to generate a control signal for the coating apparatus. Where the sensitive area of the sensing means is not co-extensive with the coating zone of the coating apparatus, the control signal is stored in a memory means synchronized with the coating apparatus. The recorded signal is detected to operate the coating apparatus over the appropriate portion of its path of movement when the article to be coated is within the coating zone of the coating apparatus.

---

This application is concerned with an automatic coating system and more particularly with a system for automatically coating articles of different sizes or configuration which may pass through a coating zone in a random fashion.

It has commonly been the practice to have coating systems, as where the articles to be coated are moved through the coating zone by a conveyor, in which the coating means are reciprocated and may be turned on and off automatically on passage of the articles. However, such prior systems were generally complicated and expensive if they permited even a limited variation of article shape, size or location within the coating zone. Simple prior systems required that the articles be of the same size and shape and that they move along the same path so that controls of movement of the coating means and of the coating material discharge could be fixed. Such requirements have severely limited automatic operation of coating equipment with articles not having high production levels or where other reasons prevent accumulating and "batching" parts of the same size and shape. Furthermore, it has been particularly difficult and inefficient to use such prior automatic coating systems with irregular articles or those having large openings therein, as window or door frames.

In accordance with the present invention, article coating methods and systems are provided which permit a degree of freedom in the configuration and arrangement of the articles to be coated not readily possible before. In each case, the delivery of coating material is controlled by the configuration and location of the article being coated to permit automatic operation with articles of different size, shape or location.

A principal feature of the system is the automatic coating of randomly arranged or shaped articles with a high degree of efficiency and a relatively simple control.

Another feature of the invention is the provision of a coating system including a coating zone having the coating device adjacent thereto and a conveyor for moving successive articles through the coating zone. Means are provided for reciprocating the coating means in a path generally parallel with the surface to be coated and generally transverse to the direction of the conveyor movement. A sensor is located in fixed relation to the coating means and is reciprocated therewith for detecting the presence of an article. Means responsive to the sensor controls delivery of the coating material from the coating device so that the coating material is discharged only when an article to be coated or a portion thereof is adjacent the coating means in the coating zone. As will appear, systems incorporating the invention may be utilized to perform both repetitive and non-repetitive coating operations on regular or irregular articles including, for example, the coating of narrow elongated articles of varied lengths striping or shading of articles of varied dimensions and the like.

A further feature of the invention is that the articles are supported so that either the upper or lower edge of each is aligned to pass through the coating zone at substantially the same level. One limit of movement of the reciprocating means corresponds with such level and the control means responds to detection of an article in the coating zone, initiating a traverse of the reciprocating means toward the other limit and the delivery of coating material from the coating means.

Still another feature of the invention is the provision of a system wherein the articles to be coated have upper and lower edges and are supported on the conveyor at random heights, with a second sensing means in the path of the articles to detect the presence of an article in the coating zone and means responsive thereto to initiate reciprocation of the coating means.

Yet a further feature is that a second sensing means detects the approach of an article at a point spaced from the coating zone and the control includes delay means connected between the second sensing means and the reciprocating means.

Another feature of the invention is the provision of a coating apparatus in which the coating and sensing means reciprocate constantly between two limits and including recording means which responds to the sensing means for recording the presence and configuration of an article in the coating zone, with control means responsive to the recording means for controlling delivery of coating material in accordance with the configuration of the article. More particularly, the coating means follows a path with relation to the article which is generally the same as the path followed by the sensing means so that the recorded information accurately controls delivery of coating material over that portion of the path corresponding to the presence of the article surface before the coating means. This apparatus is capable of coating randomly presented articles which may be of irregular or even openwork configuration.

Still a further feature of the invention is that a recording medium moves past recording and detecting means in coordination with the reciprocation of the sensing and coating means to maintain a proper relationship of the recorded information and the position of the coating means. More specifically, an elongate recording medium moves sequentially past recording means and detecting means which are spaced therefrom.

And another feature of the invention is that a sensing means is reciprocated to scan the article to be coated, recording information as to its breadth, its length, and the absence from it of a surface to be coated while a coating means is simultaneously reciprocated coating an article or a portion of the article previously scanned in response to the information recorded during the scanning.

Further features and advantages of the invention will readily be apparent from the following specification and from the drawings, in which:

FIG. 5 is a perspective of another modification of the system of FIG. 1;

FIG. 6 is a perspective of another system embodying the invention;

FIG. 7 is a block diagram of a control for the system of FIG. 6;

FIG. 8 is an elevation of another system embodying the invention;

FIGS. 9, 10, 11, 12 and 13 are fragmentary elevations illustrating the operation of the system of FIG. 8;

FIG. 14 is a diagrammatic illustration of a control for the system of FIG. 9; and FIG. 15 is a diagrammatic illustration of the recording and detecting means of FIG. 13.

The invention is illustrated herein as incorporated in a painting system utilizing one or more automatic spray guns with air atomization and electrostatic charging and deposition of the atomized particles. The invention may be utilized with coating devices of other types, as various types of spray painting equipment, with or without electrostatic atomization, charging or deposition. However, some form of electrostatic equipment is generally preferred because of the ability of such equipment to coat surfaces not disposed toward the coating devices and the increased efficiency which it provides. The invention may also be utilized with apparatus for applying non-liquid coating, as powders, for example.

Figure 1:
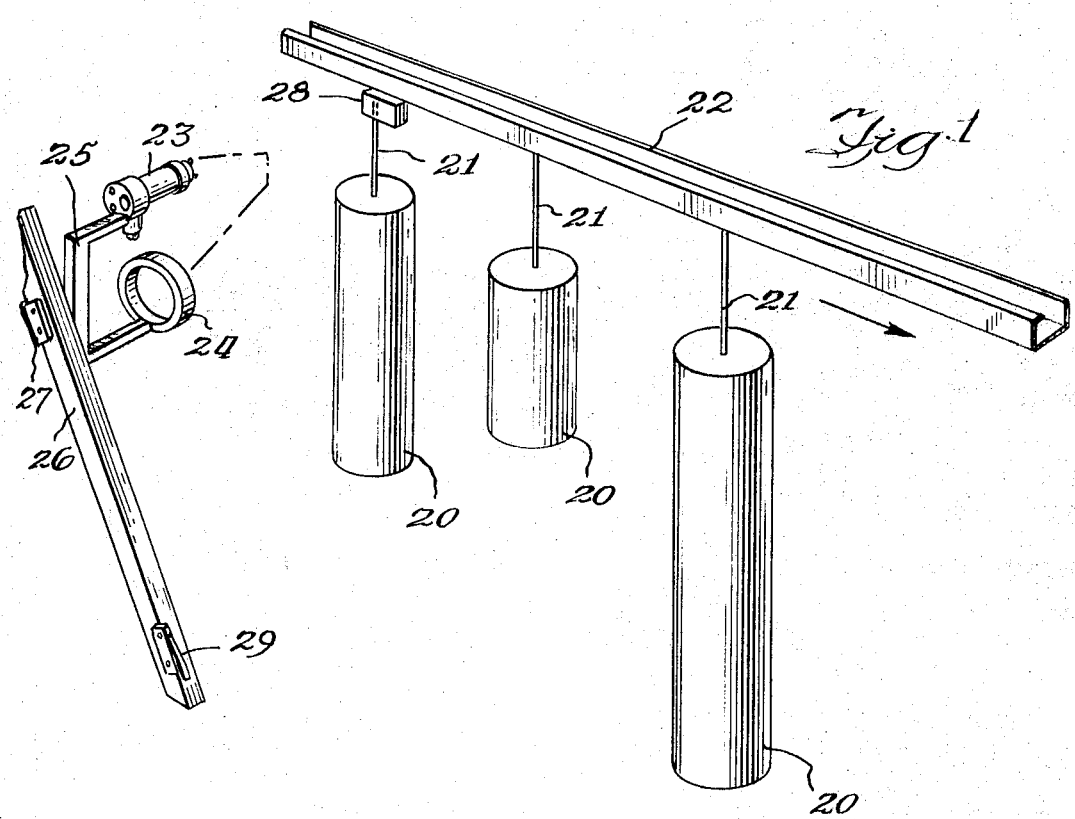
FIG. 1 is a diagrammatic perspective of a coating system embodying the invention.

One embodiment of my invention is illustrated in FIG. 1, where it is desired to coat the lateral surface of cylindrical articles 20, of different length, supported on hangers 21 from conveyor 22. The conveyor in this case is traveling from left to right. The coating device 23 and a sensor 24 are spaced apart vertically on a vertical arm 25 carried by a transverse mechanism such as reciprocator 26 and are located at an upper limit 27. The articles 20 to be coated are hung from conveyor 22 in such a manner that the tops are aligned at the same horizontal level. On entry of an article into the coating zone, hanger 21 strikes switch 28, sensor 24 detects the presence of the article, and starts operation of the traverse mechanism 26 and the discharge of coating material from coating device 23. The coating zone is that zone into which coating device 23 discharges coating material. Its size, shape and location are determined by the pattern and direction of discharge of device 23. No specific boundaries are shown as they may be varied depending on the articles coated and the coating material used. Supporting arm 25 moves downwardly and in the direction of movement of the conveyor, at a speed coordinated therewith, so that the spray pattern travels vertically down along the article. After the sensing area of sensor 24 leaves the lower edge of the article, a time delay (not shown in FIG. 1) causes the coating device to continue operating so that the lower portion of the article is adequately coated. The reciprocator reverses and returns arm 25 to the upper limit when delivery of coating material stops after expiration of the time delay or when the lower limit 29 is reached. The coating device and sensor may be horizontally spaced rather than vertically, as will appear. If the minimum possible vertical spacing between the sensor and the coating device exceeds the length of the shortest part to be coated, a horizontal spacing of the sensor and the coating device may be advisable.

The specific apparatus illustrated in FIG. 1 has several advantages over other apparatus for performing the same general coating operation. It is not necessary that special precautions be taken to prevent the articles from swinging to and fro on the conveyor. If an article should be swinging forwardly in the direction of movement of the conveyor, it might enter the sensitive area before it should. However, to prevent the spray coating device from being turned on prematurely, coincidence of "on" signals from switch 28 and the sensor 24 is necessary before coating commences. Switch 28 is located so that swinging of the parts does not greatly affect its time of actuation. After the downward traverse is started, if swinging causes the article to move momentarily out of the sensitive area, the time delay keeps the spray device from turning off prematurely.

Round cylinders of varying length are shown in FIG. 1 as the articles being coated, but other elongated articles, such as structural steel members, electrical conduit, and pipes, may be coated by this method. Elongated articles with a breath greater than the spray pattern may be coated by rotating them within the coating zone fast enough to prevent "barber poling" (deposition of the coating nonuniformly in diagonally spiraling stripes).

Figure 2:
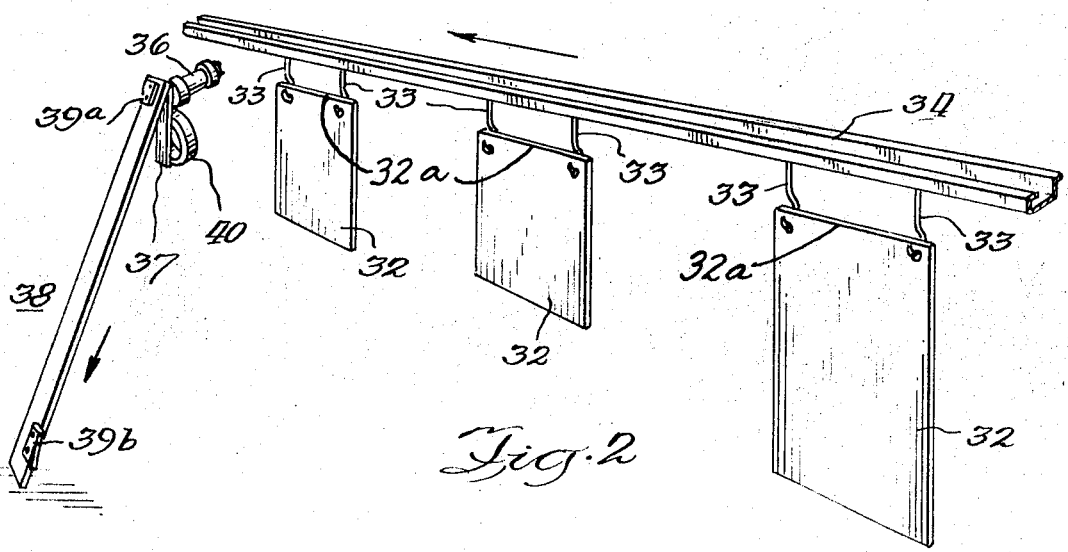
FIG. 2 is another diagrammatic perspective of a coating system embodying the invention.

A system employing the invention may be simplified and utilize only a single sensing means where the articles to be coated are arranged on a conveyor with either the upper edges or lower edges aligned and are not subject to swinging in the direction of conveyor movement. Turning now to FIG. 2, articles 32 are supported by hangers 33 from a conveyor 34. The conveyor moves the articles from right to left as viewed in the drawings, through a coating zone adjacent the automatic spray gun 36 carried on the cross arm 37 of a reciprocator 38. An article sensing means, as a magnetic proximity sensor 40, is carried on cross arm 37 adjacent gun 36. Sensor 40 is shown vertically spaced from and below gun 36. The reciprocator 38 moves the cross arm 37 together with spray gun 36 and sensing means 40 over a path essentially parallel to the surface of the articles 32 to be coated between upper and lower limits of movement. The reciprocator is capable of starting in either direction, depending on its initial position and the location of the article, and can stop, or stop and reverse, at any point in its travel. The details of the mechanism are not important. It is sufficient that the cross arm move in the appropriate direction under command of a control signal. A block diagram of a representative control system is described below.

In FIG. 2, articles 32 are so supported on the conveyor that their upper edges 32a are aligned and in the same horizontal plane as the articles pass through the coating zone. The coating apparatus 36 is held at the upper limit, preferably the same level as the upper edges of the panels and established by limit switch 39a, actuated by cross arm 37 or another suitable portion of the reciprocator 38. As an article enters the coating zone, the reciprocator is actuated to move the coating apparatus downwardly while coating material is discharged from the gun. This operation is started when the article 32 is sensed by detector 40. Cross arm 37 of the reciprocator moves downwardly at an angle and at a speed coordinated with the speed of the conveyor so that the reciprocator traverses a vertical path with respect to the article being coated and maintains the sensor and article in such a relative position that the sensor is activated. When the cross arm passes the lower edge of the article and the sensor no longer senses the presence of the article, the delivery of coating material is stopped and the reciprocator may be reversed immediately, returning the cross arm to the upper limit position ready for the next part. The coating device is not actuated during the upward pass. A lower limit is established by lower limit switch 39b. Both limit switches 39a, 39b may be adjustably mounted on the upright member of the reciprocator to facilitate adaptation of the coating system to a series of articles of different size and location. The upper switch 39a should be located to position coating means 36 at the level of the upper edge of the articles. The lower switch 39b should be located to permit travel of the coating means downwardly far enough to coat the lower portion of the longest articles.

The apparatus which has been described may be utilized in various ways to perform different coating operations. If the article being coated is no wider than the spray pattern of the coating device, a single vertical pass coats the article completely (FIG. 1). If the article is wider than the spray pattern, two or more spray guns may be mounted on the reciprocator cross arm, each operated simultaneously by the sensor 24.

One particularly advantageous application for my invention is "shading" rectangular objects (as shown in FIG. 2). "Shading" refers to the application of a stripe of coating material which is darker than the base coating, at the edge of the object to create a "shadow" effect. To "shade" the vertical edge of an object, as for example a refrigerator door, a spray gun having a spray pattern adjusted to provide a stripe of the proper width is triggered by one of the vertical edges of the object and moves along the edge of the object as described above until the moving sensor passes the lower edge of the article.

Figure 3:
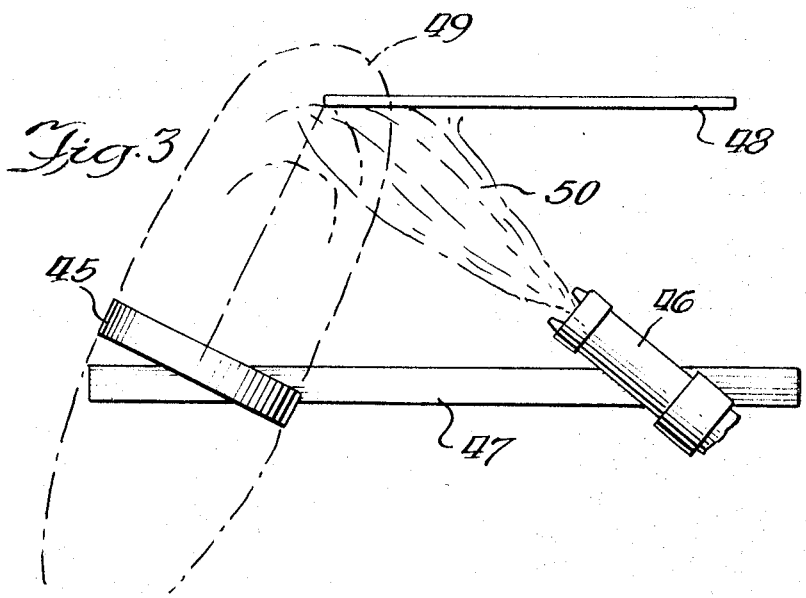
FIG. 3 is a diagrammatic, fragmentary perspective view of a spray gun and sensing device illustrating the spray and sensing patterns.

Various physical relationships between the sensitive area of the sensor and the spray pattern of the coating device may be utilized. As used herein, the term "sensitive area" means the area adjacent the sensor in which an indication is given of the presence of an article. The specific area depends upon the nature of the sensing used, the sensor geometry, the threshold or sensitivity level of the sensing circuit, and to a lesser extent on the nature of the article, i.e., whether solid or open work, for example. FIG. 3 illustrates diagrammatically the representative relationship of the sensitive area of a "magnetic" sensor 45 and the spray pattern of a spray device 46, mounted on a reciprocator cross arm 47. An article 48 is in the coating zone. The sensitive area of sensor 45 is indicated by broken lines 49, and has a lobe, the size of which depends on the sensitivity of the sensor. In most sensing apparatus of this character the sensitivity may be adjusted electrically. The pattern 50 of the coating material discharged from spray gun 41 may be controlled by changing the nozzle, varying the rate of flow of the coating material or, in an air atomizing device, the pressure of the atomizing and shaping air. In the example of FIG. 3, the sensitive area of the sensor and the spray pattern of the coating device, in the plane of the article, are generally coextensive; and the system may be described as ". . . coating where it looks . . ." In some situations it will be desirable to have the sensitive area of the sensor lead or lag the spray pattern of the coating device. Particularly where the sensitive area and the spray pattern are not coextensive, time delays may be utilized to cause the discharge of coating to start or to stop after the article enters or leaves the sensitive area.

Figure 4:
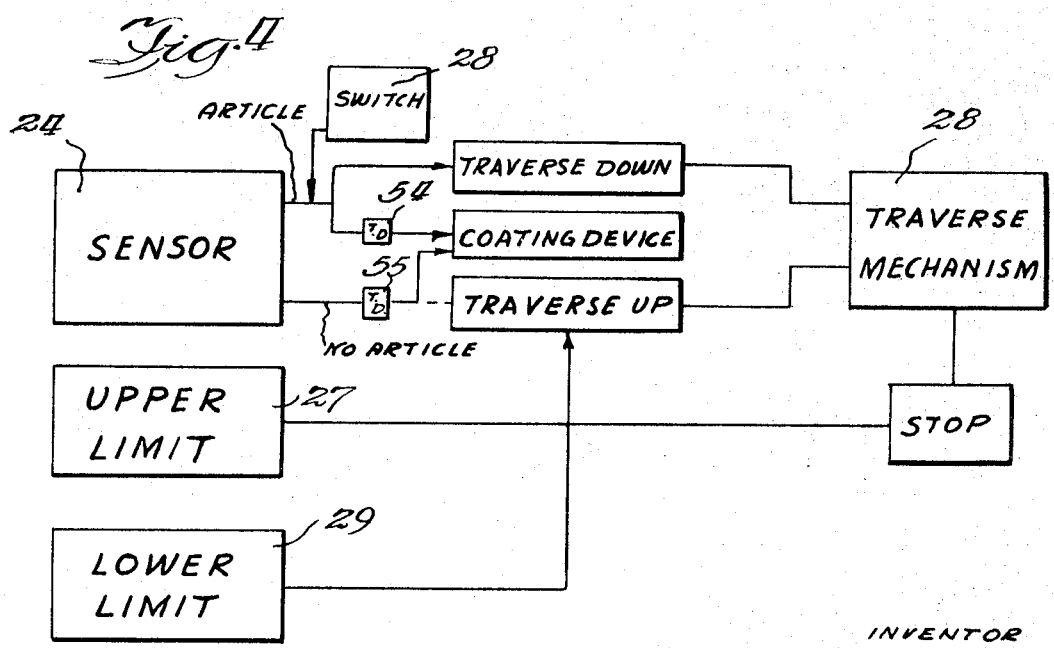
FIG. 4 is a block diagram of a control system usable with the coating systems of FIGS. 1 and 2.

A control for the apparatus of FIG. 1 is illustrated in FIG. 4. Magnetic sensor 24 has two output conditions, one indicating the presence of an article in the coating zone and the other indicating no article in the coating zone. Assuming that support arm 25 together with the sensor 24 and coating means 23 are at the upper limit position (switch 27), upon entry of an article into the coating zone the output of sensor 24 indicates the article presence. When hanger 21 trips switch 28, traverse mechanism 26 is actuated causing a downward movement of cross arm 25. At the same time, coating device 23 is turned on to discharge the coating material. Time delay 54 may retard initiation of the coating operation if the coating device is above the article. As sensor 24 leaves the lower edge of the article, a "no article" output is established which, after a suitable delay provided by time delay 55, stops the delivery of coating material and causes traverse mechanism 26 to reverse and traverse upwardly. When upper limit 27 is actuated, the traverse mechanism is stopped. Lower limit 29 is provided to stop the traverse mechanism and to avoid damage in the event the mechanism has not reversed in its downward travel before reaching a point where it might be damaged. A similar control may be used with the apparatus of FIG. 2 with the elimination of hanger switch 28.

Magnetic sensing devices 24 and 40 have been shown in the illustrative embodiments of my invention of FIGS. 1 and 2, and these are preferable for many applications where suitable articles are to be coated and the sensing device may be placed close enough to the article path for reliable sensing. Other types of detection may, of course, be utilized. For example, pneumatic sensing can be used where it is desirable to eliminate electrical or electronic equipment from the coating zone. Optical sensing may be used, although it must be so located that it does not become coated or the sensitivity of the detection may be impaired. Physical detection as by feelers or the like may also be used.

Figures 5, 13:
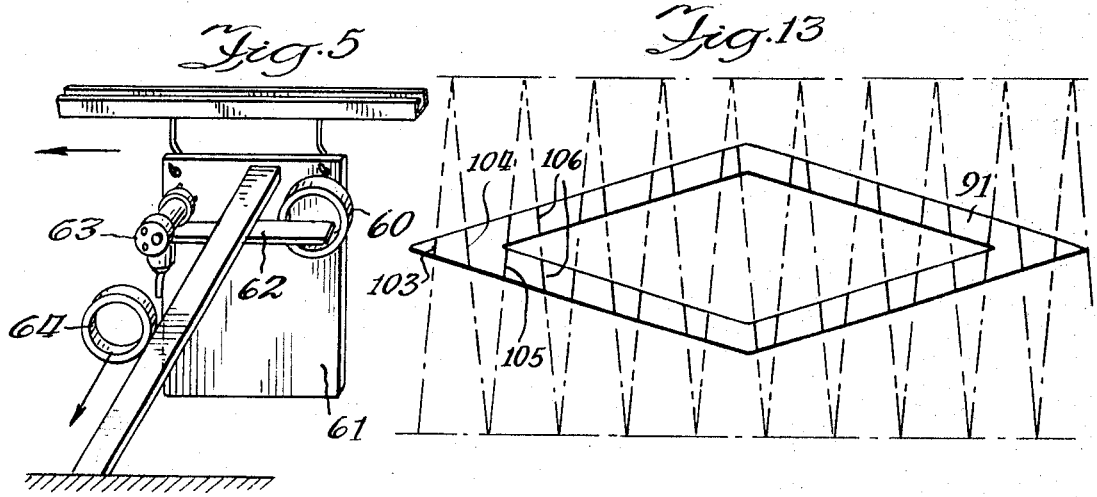

An apparatus for shading the horizontal edge of an article is illustrated in FIG. 5. Where the edge of an article, as of a refrigerator door for example, is to be shaded, the position of the coating device relative to the edge of the panel must be accurately controlled as it is generally desired to paint a uniform stripe of the order of 2 to 4 inches wide. If it were practical to hang articles on a production conveyor line with an accuracy of the order of one-half inch in the height of the edge, such shading would be a simple matter. The part could be moved through the coating zone with the edge or edges to be striped horizontal and fixed coating devices could be triggered on and off by a fixed sensing device responsive to the leading and trailing edges of the part. However, as a matter of practice, such accuracy in supporting the door panels cannot be found In fact, the level of the edges of the panels will vary by at least several inches on any practical painting line. The apparatus of FIG. 5 may be utilized to paint a stripe along a horizontal edge of a rectangular panel even though the location of the edge of succeeding articles may vary substantially.

In FIG. 5 sensor 60 is responsive to the passage of the leading edge of article 61, moving from right to left. The cross arm 62, initially positioned at or below the upper edge of the article 61, traverses downwardly until sensor 60 responds to the absence of article surface at the lower edge of the article 61. The rate of traverse is fast enough that the coating means 63 is positioned at the level of the lower edge prior to the arrival of the leading edge of article 61 in the coating zone. Upon the arrival of the article 61 at the coating zone, the coating means 63 is turned on by stationary sensor 64. When the article leaves the coating zone, sensor 64 turns off the coating material, and returns cross arm 62, sensor 60 and coating means 63 to their original position to await the next article.

The upper edge may be striped by a similar apparatus starting from below the upper edge of the panel and traversing upwardly to the upper edge. Similarly, the cross arm could start from a position above or below the article. The traverse could be initiated by a fixed switch and sensor 60 could respond to the presence of an edge rather than the absence thereof.

Articles may be hung from the conveyor with their lower edges aligned although it is not generally desirable because of the variety of article hangers required to align the lower edges of variously sized articles. In this case the moving sensor and coating means would be positioned at the level of the aligned edge. The coating means would traverse upwardly and the reciprocator track would be inclined so that the spray gun would be moved vertically relative to the article on the conveyor. Coating material may be controlled by the moving sensor during the portion of the upward traverse in which the article is sensed.

FIGS. 6 and 7 relate to a modified system in which neither the upper or lower edges of the articles need be aligned. The articles 67 are carried by hangers 68 from conveyor 69 and move from right to left as viewed in the drawing. The coating apparatus 70 and sensing device 71 are mounted on cross arm 73 of traverse mechanism 74. In the system of FIG. 6, the cross arm is located at the lower limit of its movement and moves upwardly, when an article is in the coating zone, at a speed related to the conveyor speed so that a vertical path with respect to the article is traversed by the coating device. In some cases, as with an article of irregular configuration, the speed of the traverse mechanism may be selected to establish a non-vertical path with respect to the article.

A second sensor 76 is mounted in a fixed position with respect to movement of the articles. The articles are so hung and the sensing device 76 so located that each of the articles carried by the conveyor enters the sensitive area of the sensor. For example, the midpoint of each of the articles might be hung at substantially the same level even though the upper and lower edges have a random arrangement. Sensor 76 could then be located at the level of the midpoint of the articles. Alternatively, if the articles are all the same width, the fixed sensor 76 might be positioned to respond to the hangers 68 rather than the articles themselves. In any event, sensor 76 responds to the presence of an article on the conveyor and initiates traversing movement of the cross arm 73 when the article enters the coating zone. Sensor 76 may be located at a point ahead of the coating zone and operate through a time delay means to cause operation of the traverse mechanism when the article enters the coating zone.

Upon entry of an article into the coating zone, cross arm 73 is caused to move upwardly. When detector 71 mounted on the cross arm with spray gun 70 senses the lower edge of the article, coating material is delivered to the spray gun. As the traversing mechanism and cross arm 73 pass the upper edge of the article, detector 71 indicates no article within its field and stops the delivery of the coating material to the gun. At the upper limit, the traverse mechanism reverses and cross arm 73 moves downwardly until it reaches the lower limit.

A control system for the apparatus of FIG. 6 is illustrated in block diagram, FIG. 7. Fixed sensor 76 operates through a time delay 79 to cause traverse mechanism 74 to move cross arm 73 upwardly. When moving sensor 71 detects the lower edge of an article, coating material is delivered to coating device 70. As the arm 73 passes the upper edge of the article, the delivery of coating material is terminated and at upper limit 77 traverse mechanism 59 caused to move the cross arm 58 downwardly. At the lower limit 78 the traverse mechanism is stopped.

FIGS. 8 through 15 illustrate a coating system for automatic coating of articles of irregular or random shape, size, configuration or location within the coating zone. A conveyor 90 moves an article 91 from right to left through the coating zone adjacent a plurality of spray devices 92, 93, 94 and 95 mounted in spaced relationship along an arm 96 which forms a part of a traversing mechanism 97. A sensing device 98 is mounted on the cross arm 96 at the right end, where it is approached by the leading edge of article 91 before it enters the coating zone.

Traverse mechanism 97 continuously reciprocates cross arm 96 between upper and lower limits 99, 100, respectively, which are so located that they are above and below the positions for coating upper and lower edges of the articles carried by the conveyor. The spacing between the sensing device and each of the guns are so related to the conveyor speed and to the speed of reciprocation of the cross arm that each gun follows a path relative to the article which is generally the same as that followed by the sensing device. A slight deviation in the paths of the coating devices is desirable to enhance blending of the coating material deposited on successive passes. The typical operating pattern is illustrated in FIGS. 9 to 13.

Where the reciprocation rate of the traverse mechanism 97 is such that several traverses of the article surface are made within the width of the pattern of coating material deposited from each gun, it is not necessary to control precisely the reciprocation and conveyor rate of movement to achieve uniform coating of the article.

The article 91, which as an example is a generally diamond shaped frame with an open center, is shown supported at its leading and trailing corners with its major axis extending horizontally. As the article moves into the coating zone, assume that the carrier arm 96 of the reciprocating mechanism is moving upwardly so that the sensor 98 traverses a path 103 relative to the article. The inclination of the path represents the travel of the article during passage of the sensor. The reciprocating carrier moves to its upper limit 99 and then reverses direction and moves downwardly. In the meantime article 91 advances further into the coating zone. The second pass is illustrated in FIG. 10 where sensing means 98 traverses the path 104 across the article 91. After reaching the lower limit, the reciprocating mechanism again reverses and the mechanism moves upwardly as shown in FIG. 11. Here the sensing means follows path 105. Following the next reversal of the traversal mechanism the sensor 98 will traverse the article along path 106, FIG. 12.

The information concerning the configuration of the article which is obtained by sensing means 98 as its sensitive field crosses the face of the article, is stored and utilized to control each of the coating devices so that coating material is delivered from the coating devices as each passes the article surface. The signals from the sensor correspond to the presence of the article surface between the limits marked 103a, 104a, 105a and 106a respectively on its traversals of the article surface. These signals are recorded to be utilized on later traversals of carriage 96 to control the coating means 92, 93, 94 and 95.

On the third upward traversal, for example, spray gun 92 will follow path 107 as shown in FIG. 12 and will be operated between limits 107a. Operation of the spray gun between limits 107a is effected by recovering the stored article information detected by the sensor as it traveled along path 103, FIG. 9. Although the path 107 between limits 107a need not coincide exactly with path 103, the spray gun pattern is wide enough to coat the article completely and uniformly during its succession of traversals of the article. On each succeeding traversal the spray gun 92 is operated by information which has been recorded by the sensor on a previous traversal of the article. As article 91 proceeds further into the coating zone, spray guns 93, 94 and 95 are likewise operated by the stored information from sensor 98.

FIG. 13 shows diagrammatically the entire scanning pattern of article 91, indicating in broken and solid lines the path followed by sensor 98 and coating devices 92, 93, 94 and 95. The solid line segments represent an indication by sensor 98 of the presence of the article and actuation of each coating device. The broken line segments illustrate the sensor and coating device travel outside the article surface.

It is desirable that the spray gun be operated from information previously recorded by the sensor an integral number of reciprocations (including one upward and one downward traversal) earlier. In the system described above, the first of the coating devices 92 is operated two full cycles or reciprocations later, the other coating devices each will be correspondingly operated on subsequent reciprocations. This permits the coating of asymmetrical articles. When operated thusly, information recorded at the lower portion of an upward traversal will be utilized by a spray coating means at the corresponding lower portion of its upward traversal. If, however, symmetrically configured articles are carried at the midpoint of the reciprocation range, the recorded information may be used one-half cycle later with only a slight inaccuracy which may be compensated by an overlap of the coating patterns. When a large reduction in conveyor speed is made, it is necessary to recover the stored information an integral number of reciprocations later to avoid prematurely triggering the coating devices. Where the conveyor speed is increased, the coating devices are operated an integral number of reciprocations earlier to coat the entire object.

FIGS. 14 and 15 illustrate a preferred form of control utilizing a punched paper tape memory. The paper tape 110 is drawn from a supply roll 111 over idler spindles by a drive wheel 112 which is synchronized with the reciprocation of traversing mechanism 97. This is preferably done by a direct mechanical connection illustrated diagrammatically at 113, between drive wheel 112 and a rotating gear 114 which forms a part of the drive for the reciprocator. Other means of synchronization may, of course, be utilized. The used paper tape is wound on take-up roll 115.

The sensor coil 98 is connected with a detector 117 which determines when the conductive surface of article 91 is in the field of the coil. This information is coupled to a tape punch 118 which perforates the paper tape in two laterally spaced rows, one to indicate that a conductive article has entered the sensing field and the other to indicate that it has left. A tape reader 119 senses the information stored on the tape and controls the operation of coating devices 92, 93, 94 and 95.

In FIG. 15, the paper tape 85 is illustrated moving upwardly past punches 125 and 126, which are laterally offset (not shown) to provide start and stop holes in separate paths. Tape reader 119 includes pneumatic pick-ups 128, 129, 130 and 131 adjustably mounted on vertical rod 132. There are two pick-ups for each coating device, one to detect the "turn-on" holes and the other the "turn-off" holes in the paper tape. In the system illustrated, for example, pick-up 128 may turn on coating device 92 and pick-up 129 may turn it off. Similarly, pick-ups 130 and 131 control the on and off conditions of coating device 93. Additional pick-ups (not shown) would be used to operate coating devices 94 and 95. The positions of the pick-ups may be adjusted on rod 132 to operate the coating means a selected number of reciprocations after the recordation of the sensed signal and to provide the edge coating characteristics which are desired for a particular coating operation.

The paper tape memory system illustrated is preferably for many coating systems as it requires the use of relatively little electrical equipment in the coating area where volatile materials are present. Other types of memories as a magnetic tape, or an electronic control, could be used.

My invention thus permits parts of varying configuration to be coated with a simple automatic apparatus as they traverse a coating zone. The details of the reciprocator mechanism are not important. It is sufficient that the reciprocator mechanism move the cross arm carrying the sensor and coating means cyclically through a range greater than the largest dimension of the article to be coated.

Several speed and spacing relationships are important in the system of FIGS. 8 to 15. First, the conveyor speed is established. Next, the reciprocator speed is selected to establish the spacing between successive traversals in the same direction (i.e., 103–105) such that the coating patterns overlap. Then, the coating devices are located on cross arm 96 a distance from sensor 98 substantially equal to the distance traveled by article 91 during an integral number of cycles of the reciprocator. The pick-ups of the tape reader are then set to turn the coating devices on and off at the appropriate reciprocation and the appropriate time.

It is to be understood that the specific apparatus illustrated and described above are set forth merely by way of example and that my invention is not limited to them. Changes therefore in the construction or arrangement illustrated may be made without departing from the scope of the invention as defined in the appended claims.

I claim:

1. A method of shading the edge of a rectangular article comprising passing successive articles to be shaded through a coating zone with one portion of each article aligned, detecting the position of an unaligned edge of the article by moving a sensing means toward the unaligned edge of the article while the article is before the sensing means, stopping the movement of the sensing means in response to a signal from the sensing means at the edge, positioning a coating means adjacent the sensing means to establish the coating zone at the level of the edge but in front of the article, actuating the coating means by a second sensing means at the aligned portion of the article and responsive to the width of the article to coat the portion of the article adjacent the edge and thereby give it a shaded appearance.

2. The method of operating a coating means to coat an area adjacent an edge of each of a series of panels of differing dimension, which comprises: moving said panels through a coating zone with the area of each to be coated extending generally in the direction of movement, moving said coating means transversely of the panel path in a direction toward the edge, sensing the location of said edge, stopping the movement of said coating means upon sensing said edge, and delivering coating material from said coating means as said panel passes.

3. The method of claim 2 including the step of returning said coating means to a position to intercept the next article to enter the coating zone.

4. The method of claim 3 wherein said articles move through said coating zone with the area to be coated extending generally horizontally and along the path of movement, and said coating means and a sensing means, upon entry of the panel into the coating zone, move together in a generally vertical plane adjacent the path of said articles from a rest position intermediate the upper and lower edges of said article, to the edge adjacent said area, delivering coating material from the coating means as the article passes, to apply a horizontal strip of coating material to said area adjacent the edge.

References Cited

UNITED STATES PATENTS

| | | | |
|---|---|---|---|
| 2,754,795 | 7/1956 | Enssle | 118—2 |
| 2,777,419 | 1/1957 | Paasche | 118—323 |
| 3,086,495 | 4/1963 | Knight | 118—8 |
| 3,192,796 | 7/1965 | Peeps et al. | 118—2 |
| 3,356,061 | 12/1967 | Wiggins | 118—2 |

ALFRED L. LEAVITT, Primary Examiner

M. F. ESPOSITO, Assistant Examiner

U.S. Cl. X.R.

117—105.3; 118—2, 3